2 Sheets—Sheet 2.
A. L. LINCOLN.
Machine for Cutting and Screw-Threading
Vehicle-Axles.
No. 219,641. Patented Sept. 16, 1879.
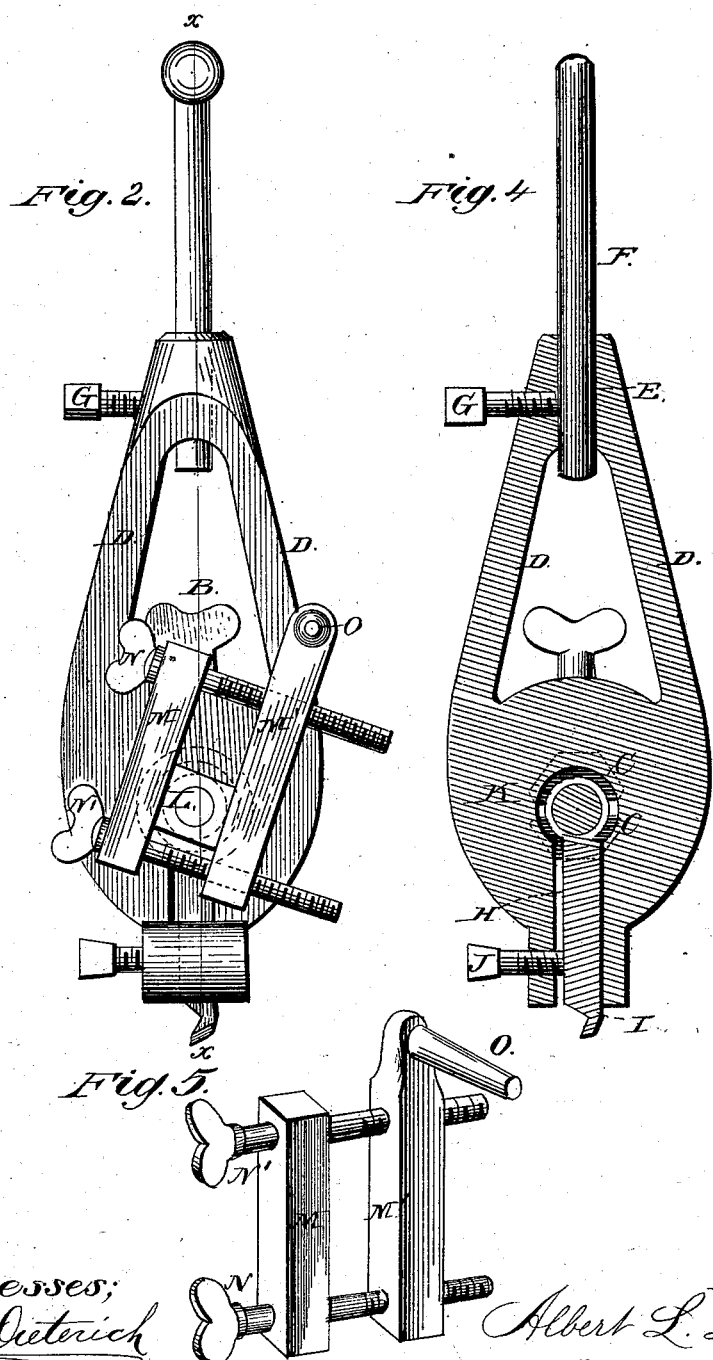

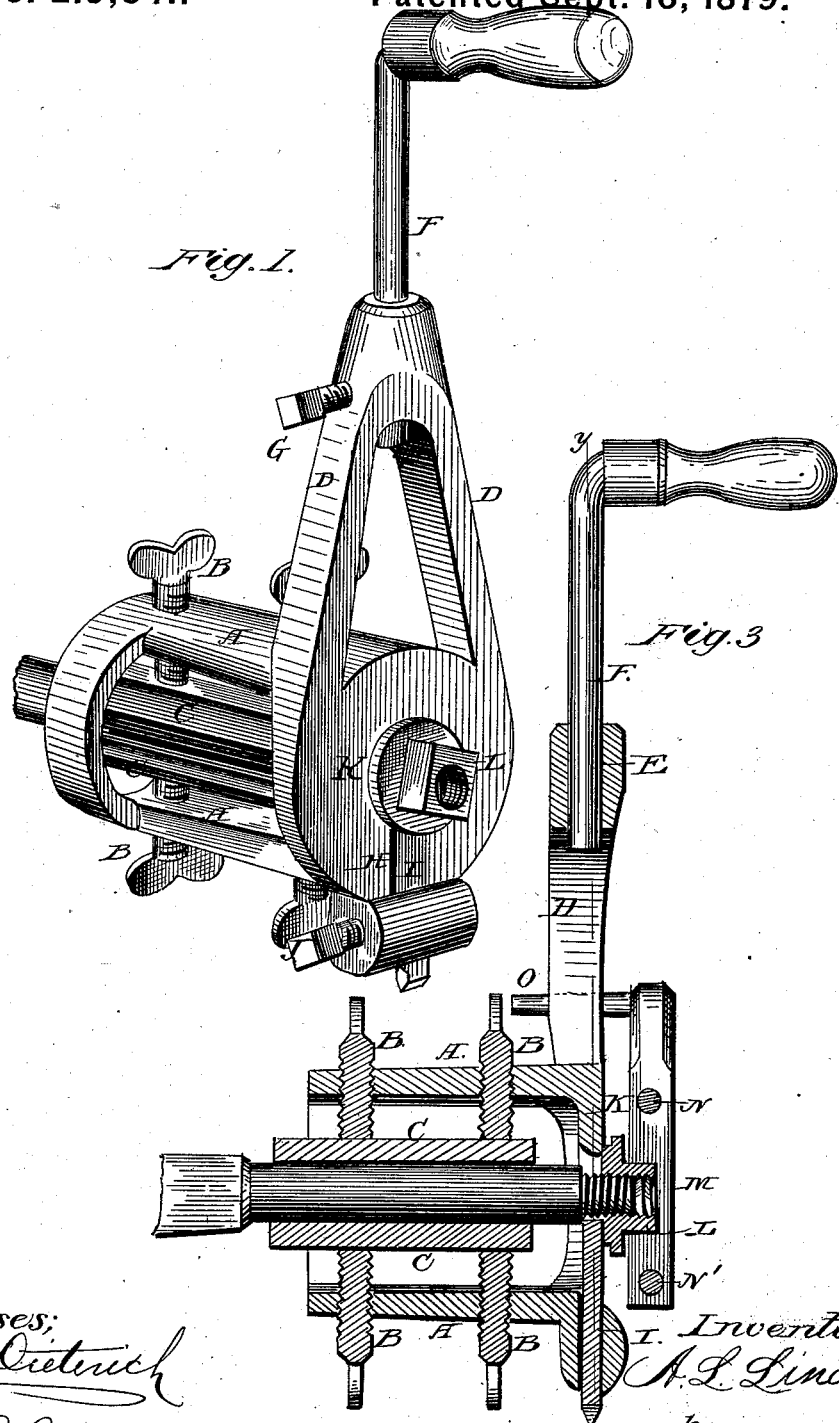

UNITED STATES PATENT OFFICE.

ALBERT L. LINCOLN, OF BETHEL, VERMONT.

IMPROVEMENT IN MACHINES FOR CUTTING AND SCREW-THREADING VEHICLE-AXLES.

Specification forming part of Letters Patent No. 219,641, dated September 16, 1879; application filed June 13, 1879.

*To all whom it may concern:*

Be it known that I, ALBERT L. LINCOLN, of Bethel, in the county of Windsor and State of Vermont, have invented certain new and useful Improvements in Machines for Cutting and Screw-Threading Vehicle-Axles; and I do hereby declare that the following is a full, clear, and exact description thereof, which will enable others skilled in the art to which it appertains to make and use the same, reference being had to the accompanying drawings, which form a part of this specification.

Figure 1 is a perspective view. Fig. 2 is a front view, with the device for feeding the machine along the axle in position. Fig. 3 is a vertical section on the line $x\ x$, Fig. 2. Fig. 4 is a cross-section on the line $y\ y$, Fig. 3; and Fig. 5 is a view of the device for feeding the machine along the axle detached.

Corresponding parts in the several figures are denoted by like letters of reference.

The object of my invention is to construct a machine for turning off the ends of old and worn carriage-axles, in order to cause them to fit the axle-boxes, and also to cut the thread of a sufficient length to perfect the adjustment.

My invention therefore consists in the improved construction and arrangement of parts, which will be hereinafter more fully described, and particularly pointed out in the claim.

In the drawings, A represents a sleeve, the sides of which are open, partly in order to make the device lighter, and partly in order to enable the operator to watch the operation. The ends of thumb-screws B B, inserted through openings in the upper and lower sides of sleeve A, press against segmental clamps C C, by means of which the device may be secured upon the spindle.

From the front end of sleeve A arms D D extend upwardly, uniting at the top so as to form a bracket, in an opening, E, of which a crank or handle, F, is adjustable, said crank being held, when properly adjusted, by a set-screw, G. The lower side of the front end of sleeve A is provided with a groove or slot, H, in which the cutting-tool I is adjustable, said tool being held, when properly adjusted, by a set-screw, J.

In operation, the device is adjusted upon the spindle, as represented in the drawings, the threaded end of the spindle projecting beyond the front plate, K, of sleeve A, in order to enable the cutting-tool to be properly adjusted against the edge which is to be trimmed. The nut L is then adjusted upon the threaded end of the spindle, and tightened down by means of a wrench against the front plate of the sleeve A, which is at the same time turned by means of the handle, which, as above described, is adjustable, in order that the proper leverage may be obtained. The pressure of the nut feeds the machine as fast as may be desired, thus causing the tool to trim the edge of the spindle.

When the edge or shoulder of the spindle has been sufficiently trimmed, the thread may be cut down to the base of the shoulder by substituting for the cutting-tool one with a V-shaped bit, which may be formed at the opposite end of the same shank, as shown in the drawings. The machine is now so adjusted as to place the point of the bit in the end of the screw-thread. The nut is now adjusted, and provided with the attachment shown in Fig. 5, which consists of two bars, M M', clamped upon the nut by thumb-screws N N', by which they are connected.

The bar M is provided with a lateral projection or dog, O, bearing against the bracket formed by the arms D D, thus turning with the device, which, being fed by the nut, causes the tool to cut a thread forming a continuation of that cut for the said nut.

Having thus described my invention, I claim and desire to secure by Letters Patent of the United States—

The combination of the sleeve A, provided with arms D D, having crank or handle F, thumb-screws B B, and clamps C C, with the clamps M M', screws N N', dog O, nut L, and cutting-tool I, as set forth.

In testimony that I claim the foregoing as my own I have hereto affixed my signature in presence of two witnesses.

ALBERT LEONARD LINCOLN. [L. S.]

Witnesses:
 FRED M. CLOUGH,
 FRED ARNOLD.